(12) United States Patent
Delius et al.

(10) Patent No.: US 7,838,094 B2
(45) Date of Patent: Nov. 23, 2010

(54) SMOKE PERMEABLE FOOD CASING BASED ON POLYAMIDE AND WATER SOLUBLE POLYMERS

(75) Inventors: Ulrich Delius, Frankfurt (DE); Michael Schmidt, Oestrich-Winkel (DE); Stefanie Stalberg, Taunusstein-Wehen (DE)

(73) Assignee: Kalle GmbH, Wiesbaden (DE)

( * ) Notice: Subject to any disclaimer, the term of this patent is extended or adjusted under 35 U.S.C. 154(b) by 1501 days.

(21) Appl. No.: 10/541,959

(22) PCT Filed: Jan. 20, 2004

(86) PCT No.: PCT/EP2004/000397

§ 371 (c)(1),
(2), (4) Date: Jul. 8, 2005

(87) PCT Pub. No.: WO2004/065466

PCT Pub. Date: Aug. 5, 2004

(65) Prior Publication Data

US 2006/0051466 A1 Mar. 9, 2006

(30) Foreign Application Priority Data

Jan. 24, 2003 (DE) .............................. 103 02 960

(51) Int. Cl.
*A22C 13/00* (2006.01)
(52) U.S. Cl. .................. 428/34.8; 428/36.9; 428/36.92; 428/474.4; 428/474.7; 428/474.9
(58) Field of Classification Search .............. 428/34.8, 428/34.9, 35.1, 35.7, 36.9, 36.91, 36.92, 428/474.4, 474.9, 474.7, 532
See application file for complete search history.

(56) References Cited

U.S. PATENT DOCUMENTS

| | | | |
|---|---|---|---|
| 4,611,019 A | 9/1986 | Lutzmann et al. | 524/169 |
| 5,747,124 A * | 5/1998 | Pophusen et al. | 428/34.8 |

FOREIGN PATENT DOCUMENTS

| | | |
|---|---|---|
| EP | 0 217 069 A1 | 4/1987 |
| JP | 62-132952 | 6/1987 |
| WO | WO 94/16020 A2 | 7/1994 |
| WO | WO 02/082913 A1 | 10/2002 |
| WO | WO 02/094023 A2 | 11/2002 |
| WO | WO 03/073861 A1 | 9/2003 |
| WO | WO 03/073862 A2 | 9/2003 |

OTHER PUBLICATIONS

G. Effenberger, Wursthüllen—Kunstdarm "Sausage casings, artificial skins", Holzmann-Buchverlag, Bad Wörishofen, $2^{nd}$ Edition [1991] pp. 21-27.

* cited by examiner

*Primary Examiner*—Michael C Miggins
(74) *Attorney, Agent, or Firm*—ProPat, L.L.C.

(57) ABSTRACT

The invention relates to a smoke-permeable, moisture-resistant, tubular, biaxially oriented, preferably also heat set food casing containing a mixture of at least one aliphatic (co) polyamide and at least one water-soluble synthetic polymer, and having a water vapor transmission rate of between 40 and 200 $g/m^2 \cdot d$. The water-soluble polymer is preferably a polyvinyl alcohol. Optionally, the mixture also contains additives which influence the optics, haptics, moisture storage capacity and peeling behavior. The casing is preferably tubular and seamless and is produced by extrusion of a corresponding thermoplastic mixture. The inventive casing is preferably used as an artifical sausage casing, especially for smokeable scalded-emulsion sausages.

21 Claims, No Drawings

SMOKE PERMEABLE FOOD CASING BASED ON POLYAMIDE AND WATER SOLUBLE POLYMERS

CROSS REFERENCE TO RELATED APPLICATIONS

This application is being filed under Rule 1.371 as a National Stage Application of International Application No. PCT/EP2004/000397, filed Jan. 20, 2004 which claims priority to the following parent application: German Patent Application No. 103 02 960.5 filed Jan. 24, 2003. The foregoing German parent application is hereby incorporated by reference herein in its entirety.

FIELD OF THE INVENTION

The present invention relates to a smoke-permeable, moisture-resistant, tubular, biaxially oriented food casing. It also relates to a method for producing the casing and its use as artificial sausage casing for smoked sausage varieties.

BACKGROUND OF THE INVENTION

For the production of smoked sausage products, hitherto principally casings based on regenerated cellulose or collagen have been used. The production of these casings is technically complex, however. For instance, cellulose casings are as a rule made by the viskose method. In this method, celluloses first converted to cellulose xanthogenate using sodium hydroxide solution and carbon disulfide ($CS_2$). What is termed viscose solution which results must first mature for a plurality of days before it is fed to the skin spinning machines. These machines essentially comprise a spinning die, precipitation baths, wash and preparation baths and also drying stations. In the precipitation baths, the cellulose xanthogenate is regenerated to form cellulose. Collagen skins, also termed hide fiber skins, comprise cured connective tissue protein. In their production, first connected tissue from animal hides is mechanically comminuted and chemically digested. The resultant homogenized mass is then further processed in a dry- or wet-spinning process. In the wet-spinning process, the collagen mass, after extrusion through a ring die, is solidified in a coagulating precipitation bath (G. Effenberger, Wursthüllen-Kunstdarm [Sausage casings, artificial skins], Holzmann-Buchverlag, Bad Wörishofen, $2^{nd}$ Edition [1991] pp. 21-27).

Cellulose casings and collagen casings are very highly permeable not only to smoke, but also to water vapor. The permeability is generally more than 500 g/m²·d. Owing to the high water vapor transmission rate of the casing, however, the sausage dries out in an unwanted manner when it is stored for some time.

A further disadvantage of collagen casings and cellulose casings is the high production costs owing to said wet-chemical processes.

For unsmoked sausage products, currently inexpensive casings made of thermoplastics are widely used. Customary plastics are polyamides, polyesters and vinyl chloride copolymers. The casings can be single-layered or multilayered. In the multilayered casings, frequently polyolefin layers are also present. The decisive advantage of these casings is the technically relatively simple and inexpensive production. Casings made of thermoplastic have a water vapor transmission rate (WVTR) of about 3 to 20 g/m²·d. They are thus markedly less permeable than casings made of regenerated cellulose or collagen. Sausage products in such a casing therefore loose markedly less weight during storage. Casings produced from thermoplastics, for instance from polyamide, have to date been generally considered not to be permeable to smoke and therefore not smokeable.

However, some smokeable plastic casings are known. For instance, in EP-A 139 888 discloses a method for smoking foods in a casing made of aliphatic polyamide. The polyamide absorbs at least 3% by weight, preferably at least 5% by weight, of water. Smoking is therefore carried out in the presence of water or water vapor, which requires a climatically controlled smoking cabinet.

A smokeable film for packaging foods is also described in EP-A 217 069. It comprises at least one layer which comprises a mixture of polyamide, an ethylene/vinyl alcohol copolymer (EVOH) and polyolefin, the constituents of the layer being in a defined weight ratio. The layer has a water vapor transmission rate of less than 40 g/m²·d at a temperature of 40° C. and a relative air humidity of 90%. However, this is only a slight increase compared with the abovementioned range of values for thermoplastic casings. Correspondingly, under customary conditions, no satisfactory smoke permeation is to be expected either.

The object is still to provide a plastic casing which has a very good permeability to smoke without special conditions (defined air humidity, defined temperature, etc.) leading to the net during smoking. In particular, intense transfer of color and flavor to the sausage meat emulsion is to be possible not only using hot smoke (about 70 to 80° C.; particularly for scalded-emulsion sausage), but also using cold smoke (about 20 to 35° C., particular for cooked-meat sausage and raw sausage). Those skilled in the art are familiar with the fact that the diffusion of gases through plastics is highly temperature-dependent. Thus the use of cold smoke a priori requires a higher permeability of the plastic than does that of hot smoke.

The casing, furthermore, it to be inexpensive and simple to produce by the thermoplastic route. It is to be smoke-permeable and resistant even to hot water and water vapor, so that it can also be used in the production of scalded-emulsion sausage. The water vapor transmission rate of the casing (determined as specified in DIN 53 122) is to be at least 40 g/m²·d, but no more than 200 g/m²·d with unilateral impingement of the casing with air which has a temperature of 23° C. and a relative humidity of 85%, so that the foods situated in the casing dry out as little as possible after smoking.

The object is achieved by a casing of a mixture which comprises aliphatic polyamide and/or aliphatic copolyamide, at least one heat-plasticizable, water-soluble organic polymer and also if appropriate additives of other organic or inorganic substances. "Water soluble" in the context of the present invention is taken to mean polymers the solubility of which in water at 80° C. is at least 20 g/l.

Water-soluble synthetic polymers, in particular poly(vinyl alcohol) (PVAL), have already been used for a relatively long time for producing certain semi-permeable membranes. The membrane production is performed in principle from solutions. The film resulting from a precipitation process must then be crosslinked to abolish the water solubility.

Little is known to date of thermoplastic deformation of water-soluble polymers. Owing to its high polarity and the associated intermolecular interactions, its melting point is usually markedly above the decomposition temperature. Articles made of water-soluble polymers, moreover, would have to subjected to a subsequent cross-linking treatment, in order to make them moisture-resistant in the later application.

Surprisingly, it has been found that blends of aliphatic (co)polyamide and water-soluble polymer are water resistant without post-crosslinking, i.e. that virtually no water-soluble polymer is dissolved out by cold or hot water, are extrudable without decomposition and can be shaped to form tubular films, they may be processed by means of blown film processing methods to form food casings having advantageous mechanical properties and have water-vapor and smoke permeabilities in the above required range.

Blends of polyamides and water-soluble polymers are in principle already known. The relevant publications, however, do not refer to the field of application of the present invention and in addition describe other properties.

WO 94/16020 describes biodegradable blends of two polymers, of which each is to be already biodegradable. As first polymer, mention may be made of, inter alia, polyamide (PA), as second component, inter alia, PVAL, polylactide and other aliphatic polyesters. Optionally, in addition, a polysaccharide is to be admixed. In the examples, predominantly blends of EVOH and PVAL are listed. If films made from blends are treated with hot water, the PVAL is extracted from the matrix. The said blends are thus unsuitable for producing therefrom films for encasing moist foods.

WO 94/03544 discloses blends made of a water-soluble polymer and a water-insoluble matrix polymer for producing medical articles. The water-soluble polymer is a poly(ethylene glycol), a poly(ethyloxazoline), a poly vinyl(alcohol), a polyacrylamide, a polyvinylpyrrolidone or a polyacrylic acid. The matrix polymer, in turn, is an ethylene/vinyl acetate copolymer (EVA), a polyolefin, a poly(vinyl chloride) (PVC), a polystyrene, a polystyrene/butadiene copolymer, a polycarbonate, polyacrylate, a polyamide or a copolymer thereof, a polyurethane, a polyester or a copolymer thereof. The surface of the articles is hydrophilic and protein-compatible, which decreases, in particular, the absorption of blood protein.

JP-A-62-132952 discloses thermoplastic blends of 20 to 80% by weight of a polyamide and 80 to 20% by weight of PVAL and also articles produced therefrom, for example films and tubes, which are distinguished by a decreased electrical surface resistance and as a result improved antistatic properties.

U.S. Pat. No. 4,611,019 relates to a blend of thermoplastic poly(vinyl alcohol) homopolymer having a degree of saponification of more than 95%, a plasticizer and a small fraction (0.5 to 4.5% by weight, based on PVAL) of polyamide or polyester. Compared with pure PVAL, the blend has the advantage of an improved oxygen barrier, in particular at high humidities (i.e. at more than 75% relative humidity). This observation opposes the inventive object in which permeation of (smoke) gases is actually desired.

SUMMARY OF THE INVENTION

In summary, it can be stated that although thermoplastic blends of polyamides and water-soluble polymers are already known, hitherto, however, no indications exist of high water vapor transmission rates and smoke permeability of such blends or offering suitability for producing food casings.

The present invention thus relates to a smoke-permeable moisture-resistant, tubular, biaxially oriented food casing which is characterized in that it comprises a mixture of at least one aliphatic (co-)polyamide and/or at least one water-soluble synthetic organic polymer and in that the water vapor transmission rate of the casing is 40 to 200 $g/m^2 \cdot d$. If appropriate, the mixture additionally comprises one or more further organic and/or inorganic substances which modify the properties of the casing.

DETAILED DESCRIPTION OF ADVANTAGEOUS EMBODIMENTS OF THE INVENTION

The term "(co-)polyamide" is used in the context of the present invention as short for "polyamide or copolyamide". "(Meth)acrylic acid" is "acrylic acid and/or methacrylic acid". The corresponding applies to "(meth)acrylamide" and similar names.

Of the aliphatic (co-)polyamides, preference is given to poly($\epsilon$-caprolactam), also termed nylon 6, the polyamide of hexamethylenediamine and adipic acid (=poly(hexamethylene adipamide) or nylon 66), the copolyamide of $\epsilon$-caprolactam and $\omega$-laurolactam (=nylon 6/12) and also nylon 6/66. The copolyamides also include heterofunctional polyamides, in particular polyetheramides, polyesteramides, polyetheresteramides and polyamide urethanes. Among these polymers, preference is given to those having block-type distribution of the various functionalities, i.e. block copolymers. Particularly preferred block copolymers are poly(ether block amides).

The proportion of aliphatic (co-)polyamide is generally 40 to 94% by weight, preferably 55 to 90% by weight, particularly preferably 60 to 85% by weight, in each case based on the total weight of the mixture.

The water-soluble, heat-plasticizable, synthetic, organic polymer is preferably a) a poly(vinyl alcohol) (PVAL), as obtainable by partial or complete saponification of poly(vinyl acetate) (PVAC), or a copolymer having vinyl alcohol units (for example a copolymer having units of vinyl alcohol and propen-1-ol), b) a poly(alkylene glycol), in particular poly(ethylene glycol), poly(propylene glycol) or a corresponding copolymer having alkylene glycol units, in particular ethylene glycol and/or propylene glycol units, and units of other monomers, c) a polyvinylpyrrolidone or a water-soluble copolymer having vinylpyrrolidone units and units of at least one $\alpha,\beta$-olefinically unsaturated monomer, d) a polymer of N-vinylalkylamides, e.g. poly(N-vinylformamide), poly(N-vinylacetamide) or e) a (co-)polymer of or comprising units of $\alpha,\beta$-unsaturated carboxylic acids or $\alpha,\beta$-unsaturated carboxamides, in particular with units of (meth)acrylic acid and/or (meth)acrylamide.

Of these groups, a) is particularly preferred. Very particular preference is given to a PVAL having a mean molecular weight $M_w$ of 10,000 to 50,000 and a degree of saponification of the acetate groups in the range 75 to 98%.

The content of the synthetic water-soluble polymer is generally 3 to 50% by weight, preferably 10 to 40% by weight, particularly preferably 15 to 30% by weight, based on the total weight of the thermoplastic mixture.

If appropriate, the thermoplastic mixture comprises additives which affect the properties of the casing. By this means, properties such as optics, haptics, moisture storage capacity or peeling behavior can be set exactly as desired or as required. For this, in particular polysaccharides, inorganic fillers and color pigments come into question.

Preferred organic additives are polysaccharides. These include starch (native or destructured, in the latter case having plasticizer additives such as glycerol), cellulose (in the form of powders or short fibers, the short fibers being able to be fibers of native origin or fibers produced by viscose spinning), exo-polysaccharides (such as carrageenan, locust bean gum or guar gum) and polysaccharide derivatives (such as crosslinked starch, starch esters, cellulose esters, cellulose ethers or carboxyalkylcellulose ethers).

The inorganic fillers which come into consideration are, in particular, quartz powder, titanium dioxide, calcium carbonate, talcum, mica and other aluminosilicates, glass stable fibers, other mineral fibers or microglass beads. Color pigments can, depending on the desired color, be of organic and/or inorganic nature.

Other components which are expediently present are, for example, plasticizer aids, such as glycerol, mono- and diglycols, trimethylolpropane, mono-, di- and triesters of glycerol with carboxylic acids (especially linear ($C_3$-$C_{12}$)-alkanoic acids), formamide, acetamide, N,N-dimethylformamide, N,N-dimethylacetamide, also stabilizers and processing aids.

The content of other substances present if appropriate is generally 0 to 25% by weight, preferably 1 to 20% by weight, particularly preferably 2 to 8% by weight, based on the total weight of the thermoplastic mixture. Polysaccharides should be present here in a content of a maximum 5% by weight, in order to keep the water vapor transmission rate within said limits.

The invention also relates to a method for producing the inventive food casing. The production is generally performed by extrusion processes which are known per se to those skilled in the art.

The mixture to be extruded is produced most simply by mechanical mixing of the granular components and subsequent joined melting in the extruder.

In some cases it is expedient first to premix the water-soluble synthetic polymer with one or more plasticizer(s). This premixture can be produced, for example, in a heatable kettle having a high-speed wall-scrapping agitator.

Typically, 100 parts of water-soluble polymer (such as PVAL and/or PEG) are charged in powder form and mixed with 5 to 15 parts of plasticizer (such as glycerol or ethylene glycol) and if appropriate up to 15 parts of water. With continuing stirring, the mixture is heated to 100 to 120° C. and further stirred until uniform distribution of the plasticizer is achieved. After it has cooled, a uniformly fine-grain flowable powder should be present.

This powder can be mixed directly with the remaining components and extruded or else converted in advance to granules. An advantage of the granule form is the better mixability with the further components which are generally likewise present in granular form, and also the easier feed into the extruder. For granule production, suitable systems are commercially conventional twin-shaft kneaders having a pelleting die, air-cooling section and strand pelletizer.

After the mixture has melted in the extruder, it is homogenized and jointly plasticized. The melt is then extruded through a ring die. A primary tube forms having a relatively high wall thickness. The primary tube is then rapidly cooled to freeze the amorphous state of the polymers. Then it is reheated to the temperature necessary for stretching, for example to about 80° C. The tube is then stretched in longitudinal and transverse directions, which is preferably carried out in one operation. The longitudinal stretching is customarily performed using two nip-roller pairs having increasing drive speed; the transverse stretching is performed by a gas pressure operating on the walls of the tube from the inside. The area stretching ratio (that is the product of longitudinal and transverse stretching ratio) is generally about 6 to 18, preferably about 8 to 11.

After stretching, the tube is preferably further heat set. This permits the desired shrink properties to be set exactly. Finally, the tube is cooled, laid flat and wound up.

In a particular embodiment, the tube is then made into a ring. For this the tube is inflated, heated on one side (generally without contact by radiant heat) and then bent in the heated state, so that it takes on a ring-shaped or spiral-shaped form. Methods and apparatuses for ring-shaping are generally known to those skilled in the art and also described in the patent literature.

The examples hereinafter serve for explanation, but without having the limiting character for the scope of the invention. Percentages are percentages by weight where not stated otherwise, or are clear from the context.

The following starting materials were used:

Aliphatic Polyamide (PA):
PA1: Nylon 6/66 (weight ratio 85:15 parts by weight) having a relative viscosity of 4 (measured in 96% pure sulfuric acid), ®Ultramid C4 from BASF AG
PA2: Nylon 6/12 (weight ratio 85:20 parts by weight) having a melt volume index of 50 ml/10 min (measured at 275° C. under 5 kg load), ®Grilon CR9 HV from Ems-Chemie AG Water-Soluble Synthetic Polymer (WP)
WP1: Poly(vinyl alcohol) (PVAL) having a mean molecular weight $M_w$ of 26,000 and a degree of saponification of 88% (®Mowiol 26-88 from Clariant Deutschland GmbH)
WP2: Poly(ethylene glycol) (PEG) having a mean degree of polymerization of 300 (®Genapol PEG 300 from Hoechst AG)

Plasticizing Aids (PL)
Glycerol 96% pure, purity according to DAB (Deutsches Arzneimittelbuch [German Pharmacopeia])

Other Components
Starch: Fine-grained corn starch from Cerestar
Filler batch 1: Masterbatch of calcium carbonate and nylon 6, weight ratio 50:50 (HT-MAB-PA9098 from Treffert)
Filler batch 2: Masterbatch of quartz flour and nylon 6, weight ratio 10:90®Grilon XE 3690 from Ems-Chemie AG)

In the examples, the parameters explained hereinafter are used.
phr="Parts by hundred resin added" (percent by weight based on the amount of polymer charged)
Quantities via which the casings were characterized:
a) $\sigma_R$=Yield stress [N/mm$^2$]
b) $\epsilon_R$=Elongation at break [%]
c) $\sigma_5$=Stress at 5% elongation [N/mm$^2$]
d) $\sigma_{15}$=Stress at 15% elongation [N/mm$^2$]
The parameters (a) to (d) were determined as specified in DIN 53 455 using an advance rate 50 mm/min and a clamping distance of 50 mm. Measurements were made on sample sections having a width of 15 mm which had previously been laid for 30 min in cold water.
e) WTR="Water vapor transmission rate", measured as specified in DIN 53 122 with unilateral impingement of samples with air of 85% relative humidity and at 23° C. [g/m$^2$·d]
f) Heat shrinkage=relative reduction in dimension of a section of the film after it had been stored for 15 min in water at 80° C. [%]
g) Extraction loss=weight decrease of a sample after it had been stored for 1 h in water at 80° C. and then dried in vacuo [% by weight]

Example 1

Production of a Compound from Water-Soluble Polymers and Plasticizing Aid

In a stirred tank having jacket liquid heating and a wall-scrapping agitator, at room temperature, 100 phr of WP1 were charged. With agitation at approximately 1000/min, first 20 phr of WP2 and then 10 phr of glycerol and also 3 phr of water were added. The tank contents were heated to 100 to 110° C., stirred for 15 min at this temperature and with further stirring cooled again to 30 to 40° C. The resultant powder was metered by a metering apparatus into a heated twin-shaft kneader (cylinder diameter 25 mm, L/D ratio 36) having a single-hole exit die, so that a mass flow rate of 8 kg/h resulted. The screw speed of rotation was 250/min, the heaters were set to temperatures of 120° C. (delivery site) downstream rising to 180° C. (die). The exiting water-clear strand was cooled down on an air-cooling section and subsequently chopped by means of a strand chopper to give granule grains. The resultant compound is abbreviated WP3 below.

Examples 2 to 6 and Comparative Examples C1 and C2

Production of Biaxially Oriented Tubular Casings

The components mentioned in Table 1 for each example were mechanically mixed at room temperature. Each mixture was then plasticized in a single-screw extruder at 220° C. to give a homogeneous melt and extruded at 190° C. through a ring die to give a primary tube. The tube was rapidly cooled, then heated to the minimum temperature required for stretching (about 70° C.), biaxially stretched using compressed air acting from the interior and then heat set in a further heating zone. The heat setting reduced the transverse stretching by about 10%. The finished casings were laid flat and wound up to form rolls.

The stretching ratios of the finished food casings and also their wall thicknesses can likewise be seen in Table 1. The diameters of the casings were not listed; they may be calculated simply if appropriate, by multiplying the primary tube diameters given by the total stretching ratios.

TABLE 1

Production data for casing examples

| Example | Aliphatic polyamide (PA) | Water-soluble polymer (WP) | Plasticizing aid (PL) | Further component | Primary tube ø [mm] | Total transverse stretching index | Total longitudinal stretching index | Wall thickness of the final tubes [μm] |
|---|---|---|---|---|---|---|---|---|
| 2 | PA1 68% by wt. | WP3 30% by wt. | — | Filler batch 1 2% by wt. | 14 | 3.0 | 2.75 | 25 |
| 3 | PA1 81% by wt. | WP2 15% by wt. | Glycerol 2% by wt. | Filler batch 1 2% by wt. | 14 | 3.1 | 2.88 | 25 |
| 4 | PA2 68% by wt. | WP3 30% by wt. | — | Filler batch 1 2% by wt. | 16 | 3.1 | 2.88 | 25 |
| 5 | PA1 69% by wt. | WP3 25% by wt. | Glycerol 2% by wt. | Starch 4.0% by wt. | 16 | 3.2 | 2.75 | 35 |
| 6 | PA1 67.5% by wt. | WP3 20% by wt. | Glycerol 2.5% by wt. | Starch filler batch 2 each 5% by wt. | 14 | 3.2 | 2.75 | 50 |
| C1 | PA1 98% by wt. | — | — | Filler batch 1 2% by wt. | 14 | 3.0 | 2.75 | 25 |
| C2 | PA1 93.5% by wt. | — | Glycerol 2% by wt. | Starch 4.5% by wt. | 16 | 3.1 | 2.75 | 35 |

TABLE 2

Test figures of the casing examples

| Example | $\sigma_R$ [N/mm²] longitudinal/ transverse | $\epsilon_E$ [%] longitudinal/ transverse | $\sigma_5$ [N/mm²] longitudinal/ transverse | $\sigma_{15}$ [N/mm²] longitudinal/ transverse | Heat shrinkage [%] longitudinal/ transverse | Extraction loss [%] | WTR [g/m²·d] |
|---|---|---|---|---|---|---|---|
| 2 | 45/52 | 95/70 | 4.5/4.0 | 13/12.5 | 18/17 | 2.9 | 110 |
| 3 | 82/75 | 100/80 | 8.5/6.2 | 17.5/16 | 20/18 | 1.8 | 72 |
| 4 | 48/42 | 90/65 | 5.2/4.8 | 14.5/13 | 18/16 | 2.8 | 93 |
| 5 | 71/40 | 130/40 | 5.9/5 | 12/15 | 10/8 | 4.3 | 86 |
| 6 | 56/65 | 160/100 | 6.3/6.1 | 13/16 | 6/5 | 4.4 | 81 |
| C1 | 88/81 | 110/85 | 8.8/7.1 | 18/17.5 | 19/18 | 0.2 | 26 |
| C2 | 83/54 | 120/45 | 7.5/6.8 | 14/14 | 9/8 | 1.7 | 24 |

The values for extraction loss verify that, under the action of hot water, only the plasticizing aid, but not the water-soluble synthetic polymer was dissolved out of the casing.

The values for the water vapor transmission rate (WTR) are a measure of the smoke permeability of the samples. In the case of Examples 2 to 6, they are many times higher than for the comparative examples. This clearly shows the superiority of the inventive casing compared with the prior art.

Casing sections were stuffed with fine-grained scalded-emulsion sausage meat emulsion at a constant stuffing pressure and closed at the ends by metal clips. Then the sausages were treated in a scalding cabinet with smoke generator with smoke-saturated water vapor at 75° C. for 30 min, then they were cooked for 60 min with water vapor without smoke at 80° C. The sausages were cooled in air to room temperature and then stored in a cold room at about 6° C.

TABLE 3

Results of the sausage stuffing tests

| Example | Tightness[1] | Uncoiling behavior[2] | Smoked color[3] | Smoked flavor[4] |
|---|---|---|---|---|
| 2 | 1 | 2 | 7 | 8 |
| 3 | 2 | 2 | 5 | 6 |
| 4 | 1 | 2 | 6 | 7 |
| 5 | 2 | 1 | 8 | 8 |
| 6 | 2 | 1 | 8 | 9 |
| C1 | 1 | 3 | 0 | 1 |
| C2 | 3 | 1 | 2 | 3 |

Table 3 shows that the sausage emulsion is markedly more deeply colored and has a more intense smoked flavor after smoking in the inventive casings than in the comparative examples and/or the prior art.

Explanations of the Test Parameters in Table 3:
1) Subjective judgment of freedom from folds and consistency of the sausages (1=fault-free, 3=marked fold formation)
2) An assessment was made to what extent the casing may be uncoiled in a directionally neutral manner after cutting (1=uncoilable uniformly in all directions; 5=removal only possible in longitudinal direction)
3) Index for the brown coloration of the emulsion surface after peeling off the casing (10=very dark color, as with sausages in cellulose casing; 0=no color difference to the interior of the emulsion)
4) Subjective judgment from taste test by a series of 4 testers (10=very strong smoked taste, as with sausages in cellulose casing; 0=no smoked taste, as with unsmoked scalded-emulsion sausage)

The invention claimed is:

1. A smoke-permeable, moisture-resistant, tubular, biaxially oriented food casing, said casing comprising a mixture of at least one aliphatic (co-)polyamide and at least one water-soluble synthetic polymer,
wherein the water vapor transmission rate of the casing ranges from 40 to 200 g/m²·d, measured at 85% relative humidity and 23° C., and the resulting food casing is water resistant without crosslinking.

2. The food casing as claimed in claim 1, wherein the aliphatic (co-)polyamide is poly(ε-caprolactam), poly(hexamethylene adipamide), a copolymer of ε-caprolactam and ω-laurolactam, nylon 6/66, a polyetheramide, polyesteramide, polyetheresteramide, or polyamidourethane.

3. The food casing as claimed in claim 1, wherein the water-soluble, synthetic, organic polymer is (i) a partially or completely saponified poly(vinyl alcohol), (ii) a copolymer having vinyl alcohol units, (iii) a poly(alkylene glycol), (iv) a copolymer having alkylene glycol units, (v) a polyvinylpyrrolidone, (vi) a copolymer having vinylpyrrolidone units and units of at least one α,β-olefinically unsaturated monomer, (vii) a homopolymer or a copolymer having units of N-vinylalkylamides and/or (viii) a (co-)polymer having units of α,β-unsaturated carboxylic acids or α,β-unsaturated carboxamides.

4. The food casing as claimed in claim 1, wherein the mixture comprises a plasticizing aid selected from one or more of glycerol, mono- and diglycol, trimethylolpropane, a mono-, di- or triester of glycerol with carboxylic acids, formamide, acetamide, N,N-dimethylformamide or N,N-dimethylacetamide.

5. An artificial sausage casing comprising a food casing as claimed in claim 1.

6. The food casing as claimed in claim 1, said casing comprising a mixture of (i) thermoplastic consisting of one or more aliphatic (co-)polyamides and (ii) at least one water-soluble synthetic polymer.

7. The food casing as claimed in claim 1, wherein said casing is mono-layered.

8. The food casing as claimed in claim 1, wherein the content of the aliphatic (co-)polyamide is 50 to 94% by weight, based on the total weight of the mixture.

9. The food casing as claimed in claim 8, wherein the content of the aliphatic (co-)polyamide is 55 to 90% by weight, based on the total weight of the mixture.

10. The food casing as claimed in claim 1, wherein the content of the at least one synthetic, water-soluble polymer is 3 to 50% by weight, based on the total weight of the thermoplastic mixture.

11. The food casing as claimed in claim 10, wherein the content of the at least one synthetic, water-soluble polymer is 10 to 40% by weight, based on the total weight of the thermoplastic mixture.

12. The food casing as claimed in claim 1, wherein the mixture comprises at least one additive which influences the optics, haptics, the moisture storage capacity or the peeling behavior.

13. The food casing as claimed in claim 12, wherein the at least one additive is a polysaccharide, an inorganic filler or a color pigment.

14. The food casing as claimed in claim 13, wherein the additive is an inorganic filler consisting of quartz powder, titanium dioxide, calcium carbonate, talcum, mica or another aluminosilicate, glass staple fibers, other mineral fibers or microglass beads.

15. The food casing as claimed in claim 13, wherein the additive is a polysaccharide selected from starch, cellulose, an exo-polysaccharide or a polysaccharide derivative.

16. The food casing as claimed in claim 12, wherein the content of the at least one additive is 0 to 25% by weight, based on the total weight of the mixture.

17. The food casing as claimed in claim 16, wherein the content of the at least one additive is 1 to 20% by weight, based on the total weight of the mixture.

18. The food casing as claimed in claim 1, wherein said food casing is tubular and seamless.

19. The food casing as claimed in claim 18, wherein said food casing is bent into a ring shape.

20. The food casing as claimed in claim 1, wherein the water vapor transmission rate of the casing ranges from 72 to 200 g/m$^2$·d.

21. The food casing as claimed in claim 20, wherein the water-soluble, synthetic, organic polymer is a mixture of partially or completely saponified poly(vinyl alcohol) and a poly(alkylene glycol) and said casing further exhibits an extraction loss ranging from 2.8 to 4.4 weight %, based on the weight decrease of said casing after storage for 1 hour in water at 80° C. and subsequent drying in vacuo.

* * * * *